United States Patent

[11] 3,601,415

[72] Inventor Philip L. Bond
 Richmond, Ind.
[21] Appl. No. 14,458
[22] Filed Feb. 26, 1970
[45] Patented Aug. 24, 1971
[73] Assignee Dana Corporation
 Toledo, Ohio

[54] PISTON RING SPACER-EXPANDER
 15 Claims, 6 Drawing Figs.
[52] U.S. Cl. .................................................. 277/140,
 277/9.5
[51] Int. Cl. ................................................. F16j 9/06
[50] Field of Search.......................................... 277/138,
 139, 140, 9.5, 9, 11

[56] References Cited
 UNITED STATES PATENTS
3,103,365 9/1963 Callerfelt...................... 277/140

3,472,521 10/1969 Nisper et al................... 277/140

Primary Examiner—Robert I. Smith
Attorneys—Walter E. Pavlick, Harold D. Shall and John F. Teigland ABSTRACT: A spacer-expander for rail-ring type oil control piston ring assemblies with a deformable means secured to the spacer-expander ring and extending radially inwardly thereof for providing a temporary internal diameter for the spacer-expander ring which is as small as or smaller than the root diameter of the piston groove which will receive the ring thereby to prevent overlap of the ends of the spacer-expander ring, to center the piston ring assembly, and to inhibit "pop-out" thereof. The deformable means deforms in a manner which is at least partially resilient and is degradable upon being subjected to engine operating conditions.

PATENTED AUG 24 1971　　　　　　　　　　　　3,601,415

INVENTOR.
PHILIP L. BOND
BY
*Harold D. Shall*
ATTORNEY 3,601,415

PISTON RING SPACER-EXPANDER

BACKGROUND OF THE INVENTION

Many various types of spacer-expander rings for use in an oil ring assembly exist in the art. A pair of side rails are utilized with the spacer-expander ring, with the rails positioned on opposed axial sides of the spacer-expander and a portion of the latter engaging the radially inner side of the rails so that, when the oil ring assembly is disposed in the groove of a piston and the latter is disposed in an engine cylinder, the spacer-expander is circumferentially compressed while it axially spaces the rails and, since it is resilient and tends to circumferentially expand, it urges the rails radially outwardly against the cylinder wall.

The prior art oil rings of the above type have provided much difficulty in the assembly thereof, since, for assembly purposes, both the rails and the spacer-expander are radially split so that each presents a split annular configuration with two adjacent circumferential ends. This split configuration of the spacer-expander introduces an assembly problem in that, since it is installed in the oil ring groove first and subsequently the rails are installed and, further, since the inner diameter of the spacer-expander when its ends are in abutment is greater than the root diameter of the piston groove, the adjacent circumferential ends of the spacer-expander have a tendency to overlap each other prior to and during the assembly of the rails in the groove. This end overlap results in the rails, where they overlie the overlapped ends, projecting excessively from the oil ring groove. Once the rails and the spacer-expander are properly assembled in the oil ring groove, the rails' engagement with the spacer-expander will inhibit the overlapping thereof.

An additional problem with prior art oil rings of the above type is that after the spacer-expander and side rails have been assembled into the oil ring groove of the piston, and with the ends of the spacer-expander in proper abutment, the inner diameter of the spacer-expander is still larger than the root diameter of the oil ring groove. Accordingly, the spacer-expander and rails can move radially relative to the piston and thereby assume a noncentralized position and in many cases the eccentricity is sufficient to allow pop-out of the assembly.

Many prior art means have been devised for inhibiting overlapping of the circumferential ends of the spacer-expanders and include providing radially elongated shoulders on the ends adapted to abut each other to inhibit such overlap. However, the radial size of the shoulders is limited, since they cannot project radially beyond the rails, and therefore they do not absolutely inhibit overlap and when overlap does occur it results in any even more dilaterious condition since the elongated shoulders extend the spacer-expander an even greater radial amount than would be the case in the absence of the shoulders.

Another prior art method of preventing overlap comprises a mechanical interlock for the ends of the spacer-expander. These interlocks in operation require substantially exact alignment for engagement and once engaged are somewhat difficult to disengage. Additionally, once the interlock is engaged, even if only inadvertently during handling, it is often damaged or destroyed by a subsequent disengagement.

Yet another prior art method of preventing overlap is shown in U.S. Pat. 3,427,014, which issued on Feb. 11, 1969, wherein, while overlap can occur, nesting of the overlapped portions of the spacer-expander are prevented by utilizing antinesting inserts. However, these inserts, like the above described radially elongated shoulders, do not prevent overlap.

It is, therefore, an object of this invention to provide a spacer-exapnder for a rail-ring type oil control piston ring assembly which includes deformable means for inhibiting the circumferential ends of the spacer-expander from becoming overlapped during the assembly operation.

It is another object of this invention to provide such a spacer-expander wherein the deformable means also centers the spacer-expander after the same and the rails associated therewith have been inserted in the piston ring groove of a piston.

It is yet a further object of this invention to provide such a spacer-expander wherein the deformable means is rapidly degradable upon being subjected to engine operating conditions so that the deformable means in no way interferes with the free operation of the coil control ring subsequent to the degrading thereof.

SUMMARY OF THE INVENTION

A spacer-expander ring according to this invention is adapted to be utilized with a pair of cylinder engaging rails to thereby comprise a rail-ring type oil control ring which is positioned in the piston ring groove of a piston. With the ends of the spacer-expander in abutment, the inner diameter thereof is greater than the root diameter of the piston ring groove. Deformable means made of a material which is both resilient and crushable is secured to the spacer-expander with a portion thereof extending radially inwardly of the spacer-expander thereby to provide an effective inner diameter of the subassembly of the spacer-expander and deformable means which is as small as or smaller than the root diameter of the groove. Since this subassembly has a diameter at least as small as the root diameter of the groove, when this subassembly is placed in the piston ring groove the free length of the spacer-expander is such that the free ends thereof would just be in abutting engagement or be slightly spaced so that the circumferential extent of the spacer-expander is insufficient to allow the ends thereof to become overlapped. Further, since the deformable means can be resiliently and crushably deformed, it is deformable so that the spacer-expander can be circumferentially and radially compressed to allow the rails to be assembled thereon and to be deformed still further to allow the piston with the spacer-expander and rails assembled thereon to be inserted into the usual receiving cylinder.

By providing the deformable means in at least three circumferentially spaced positions, the same centers the ring-rail assembly with respect to the root of the piston ring groove so that "pop-out" is inhibited prior to the piston being inserted in the cylinder.

Figure 1:
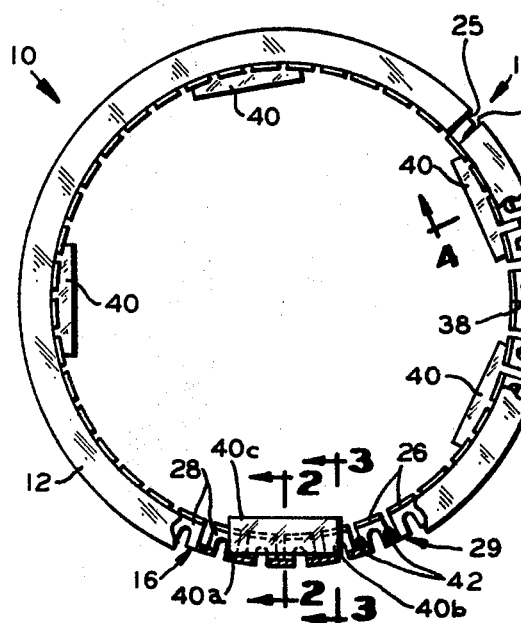
FIG. 1 is a plan view of an oil ring assembly having a spacer-expander ring incorporating this invention, various portions of the upper rail being broken away to better illustrate this spacer-expander and portions of the spacer-expander being shown in section to better illustrate the deformable means.

Referring now to FIGS. 1–5, a piston oil ring assembly 10 comprises a pair of annular rails 12 and 14 and a combined or unitary circumferentially expansible and compressible spacer-expander 16 and is adapted to be installed within a peripheral annular oil ring groove 18 formed in a piston 20 and confined within a cylinder 22 of an internal combustion engine. The spacer-expander 16 is disposed axially intermediate the rails 12 and 14 and is axially spaced from the piston 20 thereby.

Each of the rails 12 and 14 is preferably made from a flat strip of metal, such as spring steel, and is provided with a radially extending gap 13 to permit it to expand and contract in a radial direction while the circumferential length thereof remains substantially constant. It should be noted that in the assembled condition of the piston ring assembly 10, when the same is disposed in the groove 18 of the piston 20 and confined within the cylinder 22, the ends 25 and 27 of each of the rails 12 and 14, which border the gap 13 therein, still remain circumferentially spaced from each other, and the rails are radially spaced from the root 19 of the groove 18 so as to permit the radial movement of the rail. Accordingly, each rail is resilient and, by itself, exerts some outward pressure against the wall of the cylinder 22. Further, it should be noted that in order to assemble the rails 12 and 14 within the groove 18 it is necessary to radially expand the same. Additionally, when the piston 20 is confined within the cylinder 22, the latter will radially compress the rails 12 and 14.

The spacer-expander 16 comprises a plurality of circumferentially spaced U-shaped members 28, with the opening of the U being radially inwardly of the ring. The members 28 are arranged in adjacent pairs, with the paired members connected at their axially upper and also at their lower radially inner ends by a separate circumferentially extending inner support member 26. The pairs of adjacent members 28, 28 and their inner support members 26, 26 being indicated by the numeral 29. Each pair of members 29 is connected by a circumferentially extending outer support member 30 to the adjacent pair of members 29; the support member connecting the medial portion of the radial outer extremity of a member 28 of one pair of members 29 to the adjacent member 28 of the adjacent pair of members 29.

While the spacer-expander 16 is of substantially annular configuration, the same is of greater circumferential length than the rails 12 and 14 and is formed with a pair of juxtaposed circumferential ends 36 and 38. The spacer-expander 16 is made from resilient sheet metal, which is punched and folded and is circumferentially compressible and expansible, and, when the same is operatively confined within the cylinder 22 with the ends 36 and 38 in engagement, (see FIG. 5) it is circumferentially compressed and tends to expand and thereby increase its circumferential dimension. Such increase in circumferential dimension is accompanied by an increase in diameter and causes the spacer-expander 16 to exert a radially outward pressure against the inner peripheries 33 of the rails 12 and 14, thereby forcing the latter against the cylinder wall 22 with an urging force which adds to the urging force supplied by the resilient qualities of the rails 12 and 14 themselves. It should also be noted that when the oil ring 10 is compressed with the cylinder 22, the inner diameter of the spacer-expander 16 is greater than the root diameter of the groove 18. Accordingly, the spacer-expander is of the nonbottoming type.

Figure 2:
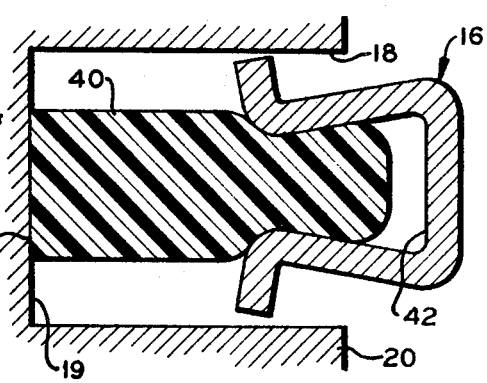
FIG. 2 is a fragmentary enlarged vertical section through a piston showing the spacer-expander ring of this invention as installed in the oil ring groove of the piston; this view of the spacer-expander being taken on the line 2—2 in FIG. 1.
Figure 3:
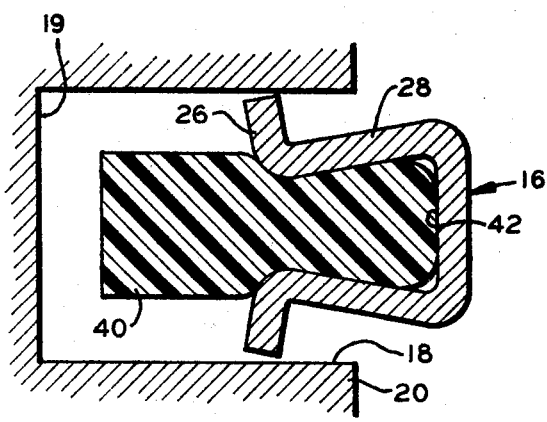
FIG. 3 is a view like FIG. 2 with the view of the spacer-expander being taken on the line 3—3 in FIG. 1.

Referring to FIGS. 1, 2 and 3, deformable means in the form of a plurality of circumferentially spaced blocks 40 are secured to the spacer-expander 16. More particularly, the blocks 40 are made from a resilient material which will rapidly degrade when exposed to engine operating conditions and will be more fully described hereinafter.

Prior to being associated with the spacer-expander 16, each block 40 has a free shape such that it can be inserted into the U-shaped members 28 from the radially inner end thereof and be slightly resiliently deformed, by being axially compressed as seen in FIGS. 2 and 3, during such insertion so as to be retained therein. Preferably the free shape of the block 40 is that of a parallelepiped with its planar surfaces rectangular and, as seen in FIG. 1, the chordal length of the block is greater than its radial or axial dimension (radial and axial being used in the sense of the orientation of the spacer-expander in the piston 20). It should be understood that shapes other than a parallelepiped can be utilized for the block 40 as will be apparent in the discussion of FIG. 6 hereinafter.

The block 40 is inserted into the spacer-expander so that its circumferentially spaced leading edges 40a and 40b can contact the inner surface 42 (see FIG. 3) of the base of a first and a second circumferentially spaced U-shaped member 28, while the portion of the block intermediate the edges 40a and 40b is spaced from the inner surface of the U-shaped members 28 adjacent thereto and intermediate the first and second U-shaped members. Thus, the medial-radially inner surface 40c of the block 40 extends radially inwardly from the radial inner edge of the inner support members 26, 26 a greater distance than does the remainder of the block 40; however, throughout the circumferential extent of the block, at least a portion thereof extends radially inwardly from the inner support members 26, 26.

In the preferred arrangement, a block 40 is inserted into the spacer-expander 16 adjacent to each end 36 and 38 thereof, a third block is inserted diametrically opposed to the ends 36 and 38, and fourth and fifth diametrically opposed blocks are inserted at locations 90° from the third block. Thus, when the spacer-expander 16 is placed in the groove 18 of the piston 20, and prior to the assembly of the rails 12 and 14 thereon, as seen in FIG. 2, the medial-radially inner surface 40c of the block 40 contacts the root 19 of the groove 18 while the circumferentially opposed ends of the radially inner surface of the block 40, as seen in FIG. 3, are spaced from the root of the groove 18. At this time, prior to the assembly of the rails 12 and 14, the blocks 40 are not radially deformed.

Accordingly, the medial-radially inner surface 40c of the blocks 40 provide the inner diameter for the subassembly comprised of the spacer-expander 16 and the blocks 40, which inner diameter, as compared to the diameter of the root 19 of the piston ring groove 18, is such that the ends 36, 38 of the spacer-expander will be just touching or slightly spaced, and the circumferential length of the spacer-expander is insufficient for the ends 36 and 38 to become overlapped. Additionally, the blocks 40 radially centralize the position of the spacer-expander in relation to the groove 18. Without the blocks 40, since the inner diameter of the spacer-expander 16, itself, is greater than the root diameter of the groove 18, the length of the spacer-expander would be great enough for the ends 36 and 38 to overlap, and the spacer-expander could shift radially relative to the groove.

Figure 4:
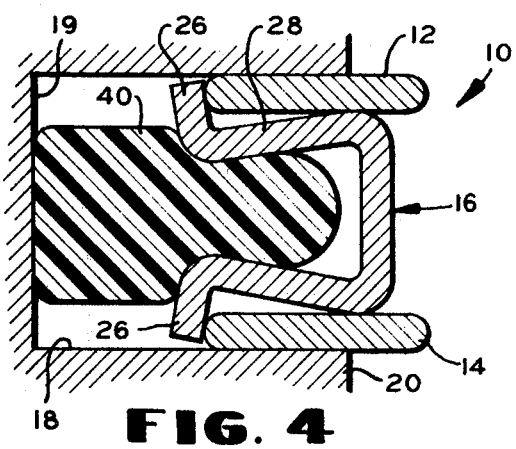
FIG. 4 is a fragmentary enlarged vertical section through a piston showing the spacer-expander of this invention and associated side rails as installed in the oil ring groove of the piston; this view of the spacer-expander and the associated rails being taken on the line 4—4 in FIG. 1.

Referring now to FIG. 4, wherein the rails 12 and 14 are shown assembled onto the spacer-expander 16 and into the groove 18, the inherent resiliency of the rails 12 and 14 exert some radially inwardly pressure against the spacer-expander 16 and resiliently deform the medial portion 40c of the blocks 40 into the shape seen in FIG. 4. At this time, the circumferentially spaced ends of the radially inner surface of the blocks 40 move into engagement with the root 19 of the groove 18 and are resiliently deformed, but to a much smaller degree than the medial portion 40c.

The relationship of the parts seen in FIG. 4 is that which exists prior to the piston with the oil ring assembly 10 assembled therein being inserted into the cylinder. At this time the engagement of the blocks 40 with the root 19 of the groove 18 radially centralizes the oil ring assembly 10 relative to the piston 20 so that no pop-out of the rails 12 and 14 will occur.

Figure 5:
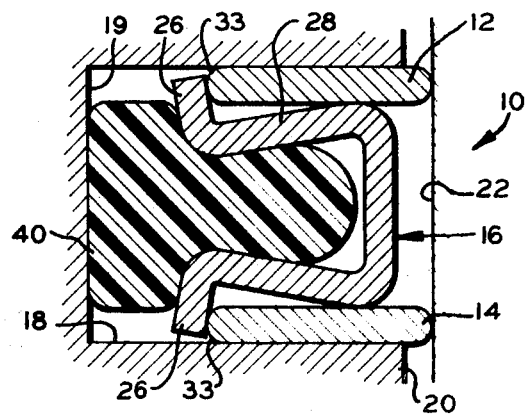
FIG. 5 is a fragmentary enlarged vertical section through a piston and an associated cylinder showing the spacer-expander of this invention and associated rails as installed in the oil ring groove of the piston and the piston being inserted in the cylinder; this view of the spacer-expander and the associated rails being taken on the line 4—4 in FIG. 1.

Referring now to FIG. 5, the piston 20 and the oil ring assembly 10 are shown after the same have been inserted into the cylinder 22 of an internal combustion engine. Here the rails 12 and 14 have been radially compressed by their engagement with the cylinder 22 to thereby further force the spacer-expander 16 radially inwardly. This radial compression of the spacer-expander 16 results in a circumferential compression thereof. Simultaneously, the medial portion 40c of the blocks 40 are deformed to the shape seen in FIG. 5, while the radially inner circumferentially spaced end portions of the blocks 40 are also further deformed, but not to the extent that the medial portion 40c is deformed.

Figure 6:
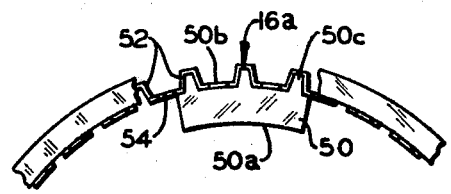
FIG. 6 is a plan view of a portion of a different spacer-expander ring having a deformable means secured thereto in accordance with this invention.

In FIG. 6, a fragment of a spacer-expander 16a is shown having a deformable means in the form of a block 50 secured to the radially inner surface thereof. Here the radially inner surface 50a of the block 50 is of arcuate shape to conform to the root of a piston ring groove throughout its length, while its radially outer periphery 50b is formed to conform to the radially inner surface of the spacer-expander 16a. The spacer-expander 16a is shaped differently than the spacer-expander 16 seen in FIG. 1, and comprises a series of portions 52 which are U-shaped when seen in the plan view shown in FIG. 6, with the portions 52 being interconnected by circumferentially extending support members 54. The projections 50c on the inner surface of the block 50, which are received into the U-shape portions 52 are dimensioned so as to be a secured press-fit thereinto or may be suitably secured by a small amount of adhesive.

A preferred material from which to make the blocks 40 and 50 has been found to be a plastic known as closed celled polystyrene foam. This is a thermo plastic material which, while being fairly rigid, is resilient in nature and, when its elastic limit is nominally exceeded, plastic and mechanical deformation will take place to relieve the stress and simultaneously with and subsequent to the plastic and mechanical deformation, elastic deformation can take place. This allows a block 40 made of polystyrene foam to be inserted into the spacer-expander 16 to deform yet still be securely attached in the spacer-expander, and also allows the oil ring 10 to be assembled into the groove 18 with the blocks resiliently centralizing the same.

A suitable source for the polystyrene foam has been found to be the Dow Chemical Company of Midland, Mich., United States of America, who market a variety of suitable types of polystyrene foam under the brand name STYROFOAM. The various types of STYROFOAM brand polystyrene material are thermo plastic, have a closed cellular structure, have density in the general range of about 1 to 5 lbs. per cubic foot and, while having excellent resistance to water, rapidly degrade in the presence of gasoline, and also degrade, although at a slower rate in room temperature lubricating oil.

One type of the STYROFOAM brand polystyrene plastic which is identified by the manufacturer as type HD300 available in extruded form from which the blocks 40 or 50 may easily be cut to size, and has provided excellent results when utilized in this invention and is easily and inexpensively fabricated and assembled. Type HD300 polystyrene has an average density of 3.3 lbs. per cubic foot, a compressive strength of 120 p.s.i., tensile strength of 225 p.s.i., shear strength of 65 p.s.i. and compressive modulus of 6000 p.s.i.

STYROFOAM brand of polystyrene foam has a heat distortion point of approximately 170° F. and above this point, softening begins and mechanical strength decreases. It has been found that at temperatures in the general range of engine operating temperature at the location of the oil ring assembly 10, i.e., approximately 190° to 200° F., the plastic shrinks and, since the cellular structure thereof collapses, the volume of shrinkage is substantial. Thus, at engine operating conditions, the temperature, the presence of gasoline and oil vapors, and an oil film itself, all of which are present in the vicinity of the oil ring groove of the piston, cause the blocks 40 or 50 to rapidly degrade and, once degraded, the same are carried away in the oil which moves through the oil ring groove in a well known manner.

This oil carries the degraded plastic into the engine sump where it either settles to the bottom or else is circulated by the coil pump and removed by the engine filter. Testing has revealed that, after only a short period of engine operation, the blocks 40 have completely disappeared from the oil ring grooves and no adverse effect upon engine operations have resulted from the degraded plastic.

Subsequent to the insertion of the piston 20, with the oil ring assembly 10 therein, into the cylinder 22, there is no further use for the blocks 40. Once the blocks 40 have degraded, the oil ring assemblies 10 are free to move in a normal manner relative to the piston 20. It should be understood that due to the deformable nature of the blocks 40, even prior to becoming degraded, they do not interfere with the normal function of the oil ring assemblies 10.

Although preferred embodiments of this invention have been shown and described, changes and modifications can be made therein without departing from the scope of this invention.

What is claimed is:

1. A circumferentially compressible and expansible piston ring element of the nonbottoming type for use in the piston ring groove of a piston, said element including a metallic portion and a deformable portion, said metallic portion having an annular shape and having a pair of circumferentially abuttable terminal ends, said metallic portion, when assembled in a piston ring groove, having an internal diameter which is greater than the root diameter of the piston ring groove, said deformable means being secured to said metallic portion and projecting radially inwardly therefrom a sufficient extent so that said piston ring element has an internal diameter which is at least as small as the root diameter of the piston ring groove into which it will be assembled, said deformable portion being rapidly degradable when exposed to engine operating conditions.

2. A piston ring element according to claim 1 wherein said piston ring element is a spacer-expander for a combined rail-ring type oil control piston ring.

3. A piston ring element according to claim 1 wherein said deformable means is made from a resilient plastic material.

4. A piston ring element according to claim 3 wherein said resilient material is a closed cell polystyrene foam.

5. A piston ring element according to claim 4 wherein said polystyrene foam material has a density of about 3.3 pounds per cubic foot, a compressive strength of about 120 p.s.i., a tensile strength of about 225 p.s.i., a sheer strength of about 65 p.s.i. and a compressive modulus of about 6000 p.s.i.

6. A spacer-expander for spacing and outwardly urging a pair of rails in a piston oil ring comprising a parted circumferentially compressible and expansible metallic ring of the nonbottoming type, with the ends of said parted ring in abutting engagement said parted ring having an internal diameter which is greater than the root diameter of a piston ring groove adapted to receive the same, and a plurality of deformable members secured to said parted ring at spaced circumferential locations and projecting radially inwardly therefrom a sufficient extent so that said spacer-expander has an internal diameter which is at least as small as the root diameter of a piston ring groove into which it will be assembled, said deformable means being rapidly degradable when exposed to engine operating conditions.

7. A spacer-expander according to claim 6 wherein said deformable means is made from a plastic material adapted to resiliently and plastically deform when compressed and, when exposed to heat in excess of 170° F. and lubricating oil, rapidly degrades.

8. A spacer-expander according to claim 7 wherein said deformable means is made of foamed polystyrene material.

9. A circumferentially compressible and expansible spacer-expander, having a metallic portion with a split annular configuration which has an internal diameter, when its ends are placed in abutting relationship, which is greater than the root diameter of a piston ring groove into which it is adapted to be installed, and a plurality of deformable plastic elements secured to said metallic portion and extending radially inwardly therefrom a sufficient amount such that when said spacer-expander is disposed in the piston ring groove, it has an effective internal diameter substantially equal in size to the root diameter of the groove.

10. A spacer-expander according to claim 9 wherein said plastic elements are rapidly degradable when exposed to engine operating conditions.

11. A spacer-expander according to claim 10 wherein said plastic elements are made of foamed polystyrene.

12. A spacer-expander according to claim 11 wherein said metallic portion is comprised of a plurality of U-shaped segments which open radially inwardly, said plastic elements are inserted into said segments from the open end thereof, said elements have an axial thickness in the free state which is greater than the axial extent of the open end of said segments and are axially compressed upon insertion therein, and said plastic elements extend radially inwardly from said segments.

13. A piston and oil ring assembly adapted for insertion in the cylinder of an engine comprising in combination, a piston having an oil ring groove therein, a combined rail-ring oil control ring disposed in said oil ring groove, and easily deformable means disposed within said groove and radially compressed between the root of said groove and said oil control ring for radially centering said oil control ring relative to the root of said groove.

14. An assembly according to claim 13 wherein said deformable means is made from a resilient material.

15. An assembly according to claim 13 wherein said deformable means is rapidly degradable upon being exposed to engine operating conditions.